Figure 1:
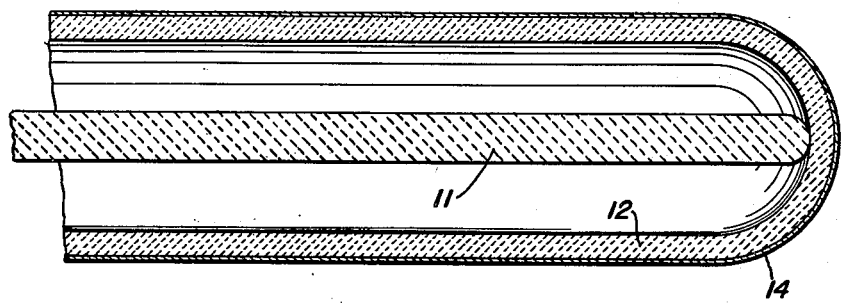

INVENTORS
KENNETH C. NICHOLSON
AND ROGER C. EMANUELSON
BY

ATTORNEY

United States Patent Office 3,011,006
Patented Nov. 28, 1961

3,011,006
PROCESS AND APPARATUS FOR MEASURING
HIGH TEMPERATURES
Kenneth C. Nicholson, Niagara Falls, and Roger C. Emanuelson, Grand Island, N.Y., assignors to The Carborundum Company, Niagara Falls, N.Y., a corporation of Delaware
Filed Nov. 10, 1958, Ser. No. 773,068
4 Claims. (Cl. 136—5)

This invention relates to the protection of thermocouples.

A high temperature thermocouple is often mounted for use in a protection tube, in which the thermocouple is inserted. The proection tube prevents direct contact between the sensitive elements of the thermocouple and the high temperature environment. Thus, if the environment is a molten metal that might react with the thermocouple elements, the protection tube protects the thermocouple elements by preventing direct attack by the molten metal.

In environments containing high temperature corrosive gases, pressurized protection tubes are often used. Argon or other inert gas is continuously circulated through the protection tube, to flush diffused injurious gases away from the tip or hot junction of the thermocouple.

Thermocouple protection tubes have been made from materials such as, for example, thoria, beryllia, sapphire, and alumina. Tubes made of these materials provide a degree of protection, but it has been found that progressive physical changes take place in the walls of these tubes, during high temperature exposure, and that these changes ultimately cause mechanical failure. For example, when a thermocouple protection tube made of recrystallized, high purity alumina is subjected to a full high temperature cycle, there is not infrequently an intercrystalline failure, characterized by cracking that follows the boundaries of the extremely coarse grains.

To help avoid intercrystalline failures, the refractory oxide powder that is used to fabricate the tube must be of very high purity. However, even the highest quality protection tube, that is made from a refractory oxide, has a limited service life, which depends on the operating temperatures, the nature of the environment in which the tube is employed, and the effectiveness of the auxiliary protective means, such as an inert gas purge or water cooling.

Other factors that have an unfavorable effect on service life include susceptibility to thermal shock and chemical reactions. For example, although rapid temperature fluctuations can usually be tolerated by protection tubes made from refractory oxides, in the region of ceramic plasticity, from 1600° C. (2900° F.) to 2000° C. (3630° F.), these tubes ordinarily last no more than one full high temperature cycle without failing. The temperature gradient that is set up along the length of the tube initiates dangerous thermal stresses in the tube and eventually lead to intercrystalline failure. Furthermore, in imperfectly sintered tubes made of refractory oxides, sintering shrinkage occurs that superimposes the stresses that result from progressive high temperature densification upon the thermal stresses that exist along the length of the tube. Moreover, in the high temperature range, solid phase reactions, such as oxide eutectic formation, proceed at extremely rapid rates; and therefore, any contact between a protection tube made of a refractory oxide, and another oxide surface, must be avoided.

We have proposed in our copending patent application, Serial No. 773,067, filed November 10, 1958, that a tube of self-bonded silicon carbide having a density in excess of 3.0, and a free silicon content of less than 5% by weight, be interposed between the hot junction of the thermocouple and the environment. This can be done either by using a dense silicon carbide protection tube, or by making the dense silicon carbide tube one element of the thermocouple. However, we have found that the silicon carbide is susceptible to attack by some molten metals at very high temperatures.

One object of the present invention is to provide an effective means for protecting thermocouples at very high temperatures and in many different environments.

Another object of the invention is to provide a thermocouple protection means that does not require a complicated structure.

Another object of the invention is to provide effective thermocouple protection means at relatively low cost.

A further object of the invention is to provide effective thermocouple protection means that is not susceptible to failure caused by oxide eutectic formation. A related object of the invention is to provide effective thermocouple protection means that is not as susceptible to intercrystalline failure, for example, as an alumina protection tube.

Still another object of the invention is to provide thermocouple protection means characterized by compactness and light weight.

Other objects of the invention will be apparent hereinafter from the specification and from the recital of the appended claims.

We have found that boron nitride can be employed advantageously in the protection of thermocouples. The boron nitride can be applied by a dip coating to the exterior of a tubular thermocouple element, for example, or boron nitride can be hot pressed to form a thermocouple protection tube, well, or other structure, of conventional size and shape. The word "tube" is employed hereafter to refer generically to tubes, wells, and other such protective structures for thermocouples.

According to a preferred embodiment of the invention, the boron nitride is applied as a dip coating to the exterior of a tubular thermocouple element made from silicon carbide having a density of 3.0 or more, and containing less than 5% by weight free silicon.

Figure 2:
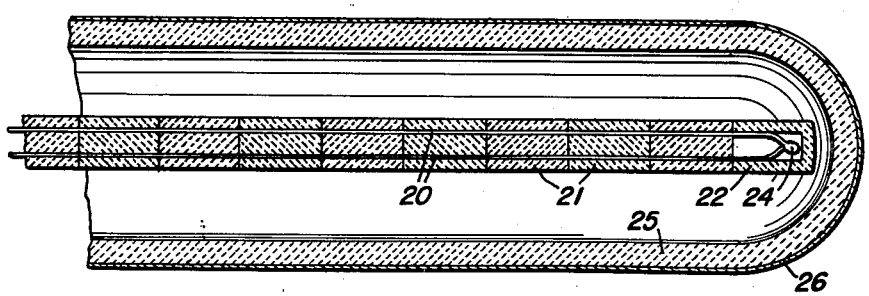
Figure 3:
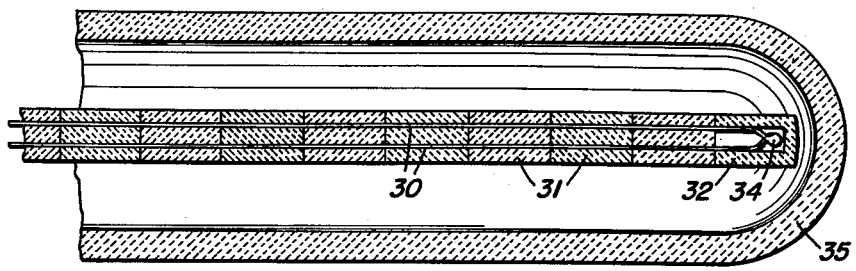

In the drawing:

FIG. 1 is a partial axial section of a thermocouple consisting of a closed end tube and a rod coaxially disposed therein, in which the tube is coated with a protective layer of boron nitride, according to one embodiment of this invention;

FIG. 2 is a partial axial section of a thermocouple protection tube that has a thermocouple supported on insulators that are disposed substantially coaxially therein, and showing the protection tube coated with a protective layer of boron nitride according to another embodiment of this invention; and FIG. 3 is a partial axial section showing a thermocouple mounted within a protection tube made of hot-pressed boron nitride, according to still another embodiment of this invention.

Referring now to the drawing by numerals of reference, 11 denotes a rod of graphite, silicon carbide, or other material that is set coaxially in a closed-end tube 12 of a dense silicon carbide that is characterized by a density of about 3.0 and that has a free silicon content of less than about 5.0% by weight, and that is characterized by a different thermoelectric characteristic than the material from which the rod 11 is made. The outer surface of the tube 12 is covered with a layer or coating 14 consisting essentially of high purity boron nitride and a binder.

The manner in which the rod 11 and the tube 12 are made is described in greater detail in our copending patent application identified above. Briefly, the rod 11 is made from extruded graphite or from recrystallized silicon carbide. The dense silicon carbide tube 12 is made by first forming a tube shape containing silicon carbide particles, a carbonaceous material, and a carbonizable material including a temporary binder, in sufficient quantity so that upon carbonization, a total amount of carbon will be deposited in the pores between the particles of silicon carbide that is equivalent to about 90% by weight of the theoretical amount of carbon that is required to react with silicon to fill these pores to form a completely solid, perfectly dense tube of silicon carbide. The shape is then carbonized and siliconized, at a temperature of at least about 1850° C., and then excess free silicon is removed.

To form the layer 14 of boron nitride on the outer surface of the tube 12, a creamy paste, containing boron nitride, is made. To make this paste, 56 parts by weight of a pure boron nitride powder are mixed with 44 parts by weight of 0-grade sodium silicate solution. The 0-grade sodium silicate has a specific gravity of about 1.40, an $Na_2O:SiO_2$ ratio of about 1:3, and contains about 40% solids. Before using the sodium silicate, it is preferably diluted with water to thin it to facilitate mixing and use of the paste. About 2 cc. of water per 100 grams of 0-grade sodium silicate solution thins the sodium silicate solution sufficiently. The boron nitride is then added to the thinned sodium silicate solution.

The slurry of boron nitride is put on the outside surface of the silicon carbide tube 12. The coating is dried in air for one hour, then oven dried at 200° C. for one hour.

To test the coated tube, it is immersed in molten iron in an induction melting furnace. The molten metal can be, for example, at approximately 1600° C. when the tube is immersed. When the tube is immersed twice, each time for a 5 second period, the coating of boron nitride retains an exceptionally good appearance. No noticeable erosion or break through to the silicon carbide thermocouple tube can be noted.

The boron nitride coating does not adversely affect the performance of the thermocouple in any way. The thermal conductivity of the thin coating of boron nitride, on the outer surface of the tube 12, is sufficient so that the response of the thermocouple is not materially affected.

Further to demonstrate the invention, a second tubular thermocouple element 12, made of dense silicon carbide, was coated with a thick, paste-like slurry of boron nitride and sodium silicate, having the composition described above, by smearing the slurry on the outside of the tube. The coated tube was then air dried for one hour, then dried in a drying oven at 90° C. for 3 minutes. This coated tube was then immersed or dipped several separate times, each time for a period of 5 seconds, in molten iron in an induction furnace. The protective coating held up very well. There was no noticeable attack after the fourth immersion. After the fifth immersion, the coating had a slightly chipped appearance in one place. No reaction with the metal melt was observed during any of the immersions. The temperature of the molten metal during these immersions was approximately 1550° C.

A third tubular thermocouple element 12, made of dense silicon carbide, was then coated with boron nitride. The creamy coating slurry was prepared from a mixture of 56 parts by weight of boron nitride and 44 parts by weight of sodium silicate, 0-grade. 50 grams of this slurry was thinned by addition of 28 cc. of water. After this thinned slurry was thoroughly mixed, the thermocouple tube was dipped into the slurry for several seconds and then pulled out. It was air dried at 90° C. for 30 minutes. It was noted that some of the coating had cracked after drying. It was theorized that cracking occurred because the coating was too thin. This coated tube was immersed in a melt of molten iron at 1550° C., and it appeared to hold up well, in spite of the crack. The time of immersion was 5 seconds.

The slurry as described immediately above was then used for coating another tubular thermocouple element made of dense silicon carbide. However, the slurry was thinned further by the addition of approximately 10 cc. of water to the remaining slurry. The tubular thermocouple element was dipped into the slurry for approximately 2 seconds, and then pulled out. In approximately 5 seconds it was dipped again. This procedure was then repeated a third time. Approximately 3 grams of slurry was applied in this manner to the lower 7 inches of the tube at its closed end. This coated tube was then air dried for 30 minutes, and oven dried at 90° C. for 30 minutes. After drying, the coated tube was immersed in molten iron at approximately 1550° C. for 10 seconds. Thereafter, it was observed that the coating retained an especially good appearance and no cracking or chipping was noted.

The boron nitride coating on the tubular thermocouple element of dense silicon carbide prevented reaction between the silicon carbide and the molten iron for periods of time sufficiently long to permit obtaining millivolt readings with the thermocouple, to determine the temperature of the molten metal.

The coating of boron nitride permits the tubular thermocouple element of dense silicon carbide to be employed in an environment of oxidizing character at temperatures of about 1700° C., since the boron nitride coating has excellent chemical stability and a relatively slow rate of oxidation.

The boron nitride coating can be applied to the tubular member of dense silicon carbide in a number of ways, such as, for example, by making a slurry and dipping, trowelling or smearing the slurry on the tube. Sodium silicate is a preferred binder for the boron nitride and can be employed in an amount as low as 10% by weight of sodium silicate on a dry weight basis. Other binders can also be used, such as, for example, lignin, phosphate binders, dextrin and other types of temporary binders.

For many high temperature measurements, a thermocouple having the structure illustrated in FIG. 1 is quite satisfactory. The tubular thermocouple element made from dense silicon carbide is substantially impervious to fluids and protects the rod element that is disposed within it. The boron nitride coating, on the exterior of the tubular element, protects both thermocouple elements. Both the tubular thermocouple element and the boron nitride coating have excellent resistance to thermal shock, and this thermocouple structure therefore has improved resistance to the type of deterioration that is characteristically caused by thermal shock.

The invention also contemplates the use of a boron nitride-coated protection tube made of silicon carbide having a density of about 3.0 and a free silicon content below about 5.0%. A protection tube of this type can be used advantageously with high temperature metallic thermocouples.

Referring now to FIG. 2, 20 denotes a pair of thermocouple lead wires that are mounted in ceramic insulators 21. A refractory protecting tip 22 of beryllium oxide is secured at the end of the ceramic insulators 21, and the hot junction 24 of the lead wires 20 is disposed within this protecting tip. This assembly is mounted generally coaxially within a protection tube 25 that is made from dense silicon carbide in the manner previously described. A protective coating 26 of boron nitride is disposed on a surface of the protection tube 25.

The metallic thermocouple can be made from any high temperature metallic elements desired, such as, for example, tungsten-molybdenum; platinum-platinum and 13% rhodium; and iridium-iridium and rhodium alloys. Where a tungsten-iridium thermocouple is employed, for example, the boron nitride-coated dense silicon carbide protection tube provides a substantially gas-tight enclosure that protects the thermocouple elements against embrittlement. If desired, the tube 25 can be threaded, or otherwise formed at its open end, for use in conventional cooling and/or gas-circulating assemblies to provide even further protection for the thermocouple.

The thin-walled protecting tip of beryllium oxide, or other refractory oxide composition, is disposed about the hot junction of the thermocouple to prevent the fused bi-metallic hot junction from touching and reacting with the silicon carbide protection tube at elevated temperatures. The protecting tip may be made of substantially any refractory oxide composition with relatively high thermal conductivity.

The refractory oxide protecting tip 22, the protection tube 25 of dense silicon carbide, and the protective coating 26 of boron nitride, all have good thermal conductivity. The thermal response of this thermocouple, protected by the coated tube, and immersed in molten metal, is rapid. For example, when a protected thermocouple of this structure is dipped in molten iron at a temperature of about 1600° C. for periods of up to about 10 seconds, thermocouple readings are rapidly obtained that indicate the temperature of the molten melt. The boron nitride coating remains intact, and the dense silicon carbide tube does not crack from thermal shock. Because of the presence of the boron nitride coating, there is no reaction between the silicon carbide protection tube and molten iron or other molten metal in the melt.

Referring now to FIG. 3, 30 denotes the lead wires of a metallic thermocouple. These wires are mounted in separate channels in ceramic insulators 31. A refractory protecting tip 32 of beryllium oxide is secured at the end of the ceramic insulators 31, and the thermocouple hot junction 34 is disposed within the protecting tip 32. This assembly is mounted in substantially coaxial fashion within the bore of a closed end protection tube 35 that is made of hot-pressed boron nitride.

To make this protection tube 35, boron nitride is preferably prepared and hot-pressed according to the teachings of U.S. Patent 2,808,314, issued October 1, 1957, to Kenneth M. Taylor. Thus, 5.3 parts by weight of boric acid is mixed with 3.0 parts by weight of tricalcium phosphate, and to this mixture, water is added to make a stiff paste. This paste is pelletized by pressing it through a fine screen, and the pellets are dried, then fired for several hours at 800° C. to 1100° C. in the presence of ammonia. The pellets are then ground and washed thoroughly with dilute acid to remove the tricalcium phosphate. After drying the boron nitride is then pressed to rod form in a graphite die, at a temperature of 1800° C. and a pressure of about 500 p.s.i. and the resulting hot-pressed rod machined to tube form. The hot-pressed and machined tube has an ivory-like appearance and is characteristically smooth to the touch. The tube has an apparent density of 2.01 grams per cc.

Protection tubes that are formed by hot-pressing substantially pure boron nitride characteristically contain boron nitride in a range of about 95% to 99%, with an average of about 97%. These percentages of boron nitride are based on the boron content of the tube, after deducting oxidic boron from the total amount of boron present.

There are numerous methods of heating and of applying pressure that could be used for hot pressing the boron nitride to form self-bonded tubes, wells and other protective shapes. In the most common types of hot pressing furnaces, temperatures in the range from 1500° C. to 2600° C. and pressures on the order of 2000 p.s.i. to 10,000 p.s.i. are employed. We prefer to use a relatively high temperature, on the order of about 1500° C. to 1900° C., and moderate pressure, on the order of 400 p.s.i. and higher, to hot-press the boron nitride. The boron nitride that is placed in the hot pressing furnace must be very finely divided and of high purity, and preferably is prepared as taught in the aforesaid Taylor patent.

The protection tube made from hot-pressed boron nitride is not wetted appreciably by molten metals at temperatures at least to about 1600° C. To demonstrate the protection afforded by this type of protection tube to a thermocouple, a dense, hot-pressed boron nitride protection tube was dipped into molten iron at a temperature of about 1600° C., withdrawn, allowed to cool, then plunged into the molten iron again. This was done repeatedly until the protection tube had been immersed and then withdrawn a total of 11 times, for periods of immersion each time of approximately 15 seconds' duration. The tube was only superficially wetted by the molten iron, was not cracked because of the thermal shock, and did not react chemically with the molten metal.

A second dense, hot-pressed boron nitride protection tube was then tested in the following manner. The tube was dipped in a melt of molten iron that was at a temperature of approximately 1600° C. The tube was left in the molten metal for approximately 5 seconds. There appeared to be a reaction with the metal, but the only change in appearance was a copper-like discoloration when the tube was actually immersed in the melt. The metal did not adhere to the surface of the tube. The weight of the tube before the test was 82.5 grams, and after the test the tube weighed the same. The tube did not crack, blister or peel. In contrast, a protection tube made from dense silicon carbide, as described above, was immersed in a melt of molten iron in the same manner and for the same period, and a slight weight loss was noted. The initial weight of the dense silicon carbide tube was 85.75 grams, and after the immersion the tube weighed 84.0 grams. Both the boron nitride tube and the silicon carbide tube were about 20 inches long and about one-half inch in outer diameter. In these tests, the portions of the tubes immersed extended about 3½" up the length of the tubes respectively from their closed ends.

Still using an induction melting furnace, the same boron nitride tube was further tested by immersing it 5 times in molten iron and removing it completely from the melt after each immersion. Total immersion time in the melt was approximately 1 minute 13 seconds. The tube did not crack or show any other ill effects. The tube lost approximately 2% of its weight as a result of these additional immersions. Next, the tube was immersed 5 times for separate immersion periods of approximately 15 seconds each, in molten iron at approximately 1500° C. The total number of immersions for this particular tube was 11, and total time in the molten iron was approximately 2 minutes, 35 seconds. The appearance of the tube remained very good.

Aggregate-free boron nitride powder has great bulk, that is, a weight of about 0.1 gm./cc. This has led to its use as a thermal insulator, and it is capable of maintaining a temperature gradient of over 2000° C. through a 1" thickness of powder under high vacuum. For this reason, its use in protection tubes for thermocouples is contraindicated to some extent. However, we have found that the thermal conductivity of a hot-pressed tube of boron nitride, and of a silicon carbide tube coated with boron nitride, is sufficiently good that accurate thermocouple readings can be taken after immersion periods of only a few seconds. Moreover, thermocouple protection tubes of the type that we have described herein resist thermal shock and have a useful service life of many full high temperature cycles. Moreover, these protection tubes are extremely resistant to penetration by fluids, and particularly in the case of the boron nitride-coated protection tube made from dense silicon carbide, usually can be operated successfully without purging the protection tube with an inert gas. In addition, these tubes are free from the danger that solid phase reactions, such as oxide eutectic formation, will occur.

In describing the use of a boron nitride protective coating, we have referred repeatedly to its use on tubes of dense silicon carbide. However, we may also employ the boron nitride coating for protecting protection tubes, wells, or other protection means, that are made, for example, of thoria, beryllia, sapphire, alumina, fused silica, and other refractory materials. The boron nitride-sodium silicate slurry bonds readily to refractory metal oxides, refractory silicates such as zircon, and also to metallic surfaces such as, for example, molybdenum.

While the invention has been described in connection with several specific embodiments thereof, it will be understood that it is capable of further modification and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having described our invention, what we claim is:

1. A thermocouple protecting device including a boron nitride tube having a closed end, said tube being substantially gas impermeable, said tube containing a thermocouple junction mounted adjacent said closed end.

2. A thermocouple protecting device including a tube having a closed end, the outer surface of the tube being coated with boron nitride such that the coated tube is substantially gas impermeable; said tube containing a thermocouple junction mounted adjacent said closed end.

3. A device according to claim 2 wherein said tube is silicon carbide.

4. A thermocouple protecting device for a given environment, including a tube having a closed end, the surface of the tube exposed to the environment being boron nitride; said tube being substantially gas impermeable and having its closed end adapted for immersion in molten metal; said tube containing a thermocouple junction mounted adjacent said closed end.

References Cited in the file of this patent

UNITED STATES PATENTS

| | | |
|---|---|---|
| 2,094,102 | Fitterer | Sept. 28, 1937 |
| 2,697,734 | Zvanut | Dec. 21, 1954 |
| 2,808,314 | Taylor | Oct. 1, 1957 |
| 2,839,413 | Taylor | June 17, 1958 |

FOREIGN PATENTS

| | | |
|---|---|---|
| 633,828 | Germany | Aug. 8, 1936 |